United States Patent Office 3,567,669
Patented Mar. 2, 1971

3,567,669
PREPARATION OF RIGID POLYVINYL CHLORIDE PARTICLES HAVING A HIGH BULK DENSITY
Joseph M. Georgiana, Painesville, Anthony M. Mierzwa, North Madison, Robert A. Paradis, Willoughby, and James A. Rolls and Donald R. Voss, Painesville, Ohio, assignors to Diamond Shamrock Corporation
No Drawing. Filed Aug. 4, 1967, Ser. No. 658,337
Int. Cl. C08f 29/18, 29/24, 45/58
U.S. Cl. 260—23.7                       6 Claims

ABSTRACT OF THE DISCLOSURE

Employing resin produced by aqueous suspension polymerization, a rigid polyvinyl chloride resin powder composition has been prepared in mixing procedures wherein maximum temperatures attained range generally from 340° F. to 425° F. By reason of these elevated mixing temperatures, the composition has a higher bulk density than similar powder formulations prepared according to prior art methods. Most important, it exhibits fusion and processing characteristics significantly altered from those of the prior art formulations and may be processed at high rates in many different types of equipment. This densified, rigid polyvinyl chloride resin powder composition is useful for the preparation of high-quality plastic articles, e.g., pipe, fittings, rods, tubes, film, sheeting or containers, both by extrusion and molding technique.

BACKGROUND OF THE INVENTION

The present invention relates to an improved rigid resin powder composition prepared from polyvinyl chloride resin produced by an aqueous suspension process. This composition is designated herein as a "densified" composition since it has a much higher bulk density than similar polyvinyl chloride resin powder formulations prepared by conventional methods as known in the art for producing resin powder compositions. This invention further relates to the preparation and use of this densified material to fabricate finished polyvinyl resin articles by extrusion and molding operations as presently practiced.

Polyvinyl resin powder compositions incorporating suspension-polymerized polymer in general have enjoyed ever-increasing commercial use in recent years. These compositions, also known as "dryblends" or "powder blends" are typically prepared by physically blending one or more polyvinyl resins together with various other ingredients such as, e.g., stabilizers, plasticizers, impact modifiers, pigments, etc. which normally are compounded with polyvinyl resins to provide the desired physical and chemical properties to finish articles fabricated therefrom. In the dry-blending operation, the various ingredients are mixed only until they are homogeneously blended together to form powders or finely granular materials of homogeneous composition. The mixing time, the shear rates applied and the maximum mixing temperature attained by the blended material are insufficient to masticate or fuse the ingredients together into a solid resinous mass. Resin dryblends are significantly different in appearance and in processing characteristics from polyvinyl resin formulations which are converted at high shear rates to fused, solid resinous masses which in turn are then ground, diced or otherwise converted into workable form prior to processing.

As initially known and used in the art, polyvinyl resin dryblends were prepared, for the most part, in blade-type mixers at low shear rates with some provision being made to supply heat to the blending components by external means. More recently, these compositions have also been prepared in high shear mixers. Such mixers are equipped with high speed agitation means wherein the heat necessary for intimate dispersion of the various additives throughout the resin is developed within the mixer from friction between impinging resin particles or from contact of the resin particles with metal components in the mixer. Usually no external heat is applied to the blending components. Whether using the low-shear or the high-shear mixing apparatus, however, the maximum temperature attained by the blended material in the dryblending process varies generally from about 180° F. to about 260° F., depending upon the particular formulation being prepared.

Still more recently, an improved polyvinyl resin powder composition of the rigid type has been developed and is in limited use in the industry. As presently practiced and reported, preparation of this material is effected in the high-shear mixing apparatus as described hereinabove, the blended material attaining a maximum temperature ranging from about 290° F. to about 340° F. This composition has a higher bulk density than the earlier dryblends and may be processed more quickly and efficiently. However, it is not always employed with entirely satisfactory results in equipment which is not generally adaptable to powder processing. Further, a phenomenon known as "dusting" is observed in presently known densified powder compositions. "Dusting" is believed to be caused primarily by the non-homogeneous dispersion of finely-divided compounding additives during the blending operation, which additives then separate out from the composition as "dust." The incomplete homogeneity of the composiiton as evidenced by "dusting" likewise contributes to the production of finished articles having unacceptable appearance and/or properties.

SUMMARY OF THE INVENTION

It is, therefore, an object of this invention to provide a densified rigid polyvinyl chloride resin powder composition which is characterized by completely homogeneous dispersion of various selected modifying ingredients throughout the resin, said homogeneous dispersion being evidenced by the substantial absence of "dusting" and by the inability to separate the various finely-divided compounding additives from the composition by physical means.

Another object of this invention is to provide from suspension-polymerized polyvinyl chloride resin, a completely homogeneous, densified rigid resin powder composition which may be processed at an accelerated rate in various types of processing equipment to prepare high-quality extruded and molded plastic articles.

A further object of this invention is to provide a mixing procedure for the preparation of a densified rigid polyvinyl chloride resin powder composition which is completely homogeneous and essentially non-dusting in character.

The present invention comprises a densified rigid polyvinyl chloride resin powder composition and its preparation and use, the said composition having an average particle size range which is essentially unchanged from that of the base polyvinyl resin employed in its preparation. Depending upon the end use to which it is to be applied, the composition contains, by weight, from about 62% to 99.2% of a particulate polyvinyl chloride resin, about 0.25% to 7% of either an organic or inorganic heat stabilizer, 0% to about 20% of a resinous impact modifier, 0% to about 20% of a filler-pigment; 0.1% to about 5% of a lubricant; and about 0% to 5% of a resinous processing aid, the percentage of ingredients other than the polyvinyl chloride resin component being based on the weight of said resin. Preparation of the composition is effected in the high-shear mixer as previously described. Depending upon the particular formulation, intimate dispersion of the various selected ingredients is effected in a total blending cycle from about 5 to 25 minutes duration while the maximum temperature attained by the blended composition generally ranges from 340° to 425° F., preferably from 360° to 390° F., which temperature is developed usually within the blend entirely by friction. The rigid powder composition which is a free-flowing, substantially non-agglomerated powder is particularly useful for the preparation of thermally-stable plastic articles both by extrusion and molding techniques.

DESCRIPTION OF THE PREFERRED EMBODIMENTS

As used herein in the specification and claims, the term "rigid polyvinyl chloride resin powder composition" is intended to refer to those compositions wherein a polyvinyl chloride resin which has been prepared by a suspension-type polymerization is in intimate physical admixture with minor quantities of various modifying ingredients as described hereinafter. In practice herein, these modifying ingredients do not usually include organic liquids which are designated in the art as plasticizers. However, for some specialized applications, the rigid resin composition may contain minor quantities of organic liquid plasticizers, such quantity not exceeding 10% based on the weight of the composition, so as not to degrade the strength and resistance properties of the resin. It is to be understood, therefore, that a rigid resin composition which contains up to 10% by weight of an organic liquid plasticizer, although not regularly employed in practice herein, is within the scope of the present invention.

The present invention encompasses a densified rigid resin powder composition which is essentially non-dusting in character, said composition comprising an intimate physical mixture of a major amount of a particulate, suspension-polymerized polyvinyl chloride resin and minor amounts of various selected ingredients such as are commonly used in polyvinyl chloride resin compositions to enhance the thermal stability of the resin, to improve or modify its processing characteristics and/or to impart certain physical properties to articles fabricated therefrom. These selected ingredients include stabilizers, resinous impact modifiers, resinous processing aids for the polymer, lubricants, pigments and colorants. The apparatus employed herein to prepare the densified rigid resin powder composition is a high-shear, jacketed mixer of the type used heretofore to prepare resin powder compositions. A mixer of this type is equipped with high-speed agitation means whereby the charged ingredients can be rapidly recirculated by centrifugal action or other similar force at high velocity and with concurrent intensive particle-to-particle and particle-to-metal impingement. Due to the intensive mixing action and the said particle impingement, large amounts of kinetic energy dissipated in the blended material are converted to heat energy which is rapidly and uniformly generated within the material by friction. In practice herein, no external heat is applied as a rule to the blended ingredients in the mixer, the heat necessary for the homogeneous dispersion of the various ingredients being developed completely within the blend by friction. However, it is to be understood that external heat may be applied to the blending ingredients through the mixer jacket without departing from the scope of this invention.

Any high-shear, high speed mixer which is commercially available at present may be suitably employed herein to prepare the densified rigid polyvinyl chloride resin powder composition provided intimate dispersion can be effected therein in an extremely short blending cycle with the desired degree of densification in the composition. Suitable commercial mixers include, for example, the Henschel "Fluid Mixer" (Prodex. Corp., Fords (N.J.); the Papenmeier Universal Dry Mixer (distributed in the U.S. by Welding Engineers, Inc., Norristown, Pa.); the Vaterland Mixer (Vaterland Werk, Neuenrade, West Germany); and the Draiswerke Plastomat (Draiswerke G.m.b.H., Mannheim-Waldhof, West Germany). Information concerning the production and operation of these mixers and other similar types is readily available so it is not believed necessary to discuss these mixers in detail herein. It is to be noted, however, that in the practice of this invention care should be exercised to employ the proper agitators and agitating speeds so that comparable energy inputs are realized if various type mixers are employed interchangeably to prepare the powder composition. Because of their greater availability by comparison to some other commercial high-intensity mixers, the Henschel Mixer and the Papenmeier Mixer are presently preferred herein. However, specific reference as may be made hereinafter to these particular mixers is not to be taken as limiting the preparation of the composition exclusively to such equipment but as being merely illustrative thereof.

The polyvinyl chloride resins which are utilized herein in the composition are prepared by conventional aqueous suspension polymerization processes as presently practiced in the art. In general, these resins have a relative viscosity ranging from about 1.70 to 3.25 and have a bulk density ranging from about 0.33 g./cc. to about 0.62 g./cc. For the production of high quality articles possessing maximum heat stability and resistance properties, however, it is preferred at present to employ resins having a relative viscosity within the range of about 1.70 to 3.00. The comparable K-value for these presently preferred resins ranges from about 52 to 84. As designated herein, the relative viscosity value is determined at 30° C., employing a 1% solution of the polymer in cyclohexanone.

As is usual practice in the art, one or more stabilizing component is incorporated into the powder composition of this invention to provide long-term heat and/or light stability to the resin. Stabilizers suitably employed herein include metallic soaps, e.g., the stearates, laurates, ricinoleates of calcium, magnesium, barium, lead, etc.; alkyl tin salts; organic esters of phosphorus acid; organic tin compounds which contain at least one Sn-S linkage, e.g., organic tin mercaptides or thioglycollates; inorganic lead salts, such as lead phosphates, silicates, etc.; and organic esters or salts containing complexed metals such as barium, cadmium, calcium or zinc. These compounds may be incorporated singly in the formulation or may be employed in combination. Depending upon the formulation being prepared, the incorporation of about 0.25 to 7 parts of stabilizer for each 100 parts of resin in the composition generally is sufficient to obtain satisfactory heat and light stability.

Depending upon the end use to which the composition is applied, it may or may not contain a resinous compound which serves as an impact modifier to provide good impact to the articles fabricated therefrom. As needed, however, there may be incorporated in the rigid polyvinyl chloride resin composition a minor amount of one or more such resinous impact modifiers, said materials being employed in an amount ranging from about 0.5 up to about 20 percent of the resin content of the composition. Suitable modifying agents thus employed include terpolymers prepared from acrylonitrile or methyl methacrylate in combination with butadiene and styrene wherein butadiene is the major constituent of the terpolymer; copolymers of ethylene and vinyl esters of lower fatty acids, e.g., vinyl acetate; copolymers of ethylene and alkyl acrylates and methacrylates; chlorinated polyethylenes and sulfochlorinated polyethylenes. In present practice, the terpolymers of acrylonitrile, butadiene and styrene and of methyl methacrylate, butadiene and styrene are the preferred modifying ingredients.

In rigid polyvinyl chloride resin powder compositions in present commercial usage, materials are oftentimes incorporated as lubricants for the resin, providing slip, anti-sticking and die-releasing properties to the resinous material during processing. Suitable compounds thus incorporated as lubricants herein include monobasic fatty acids containing from about 12 to 18 carbons per molecule; metallic salts of such monobasic fatty acids, and their ester waxes and partially saponified ester waxes; organic liquids containing epoxy groups; and various naturally occurring and synthetic hydrocarbon derivatives such as, for example, waxes, mineral oils or glycerine. These ingredients are typically incorporated in a total amount ranging from about 0.1 part up to 5 parts for each 100 parts of resin used. In formulating, the lubricants may be employed singly or two or more lubricants may be combined as the lubricant system. For convenience, these lubricants are designated generally herein as "non-resinous" ingredients.

It is also advantageous in some instances to incorporate into the resin blend one or more compounds as processing aids therefor, which compounds are typically of resinous composition. These components serve to improve the hot melt properties, i.e., the melt fracture of the composition when it is processed at extremely high shear rates or in processing equipment wherein powder compositions normally are processed only with difficulty, e.g., in extrudes with low $L/D$ barrel ratios or those equipped with low compression, single screws. Compounds suitably employed herein as processing aids include chlorinated polyethylenes of low molecule weight; acrylonitrile, butadiene and styrene terpolymers or methyl methacrylate, butadiene and styrene terpolymers, each having a high styrene content; acrylonitrile-styrene copolymers of high styrene content; and various copolymers of alkyl esters of acrylic and methacrylic acids. Depending upon the hot melt flow properties desired in the composition, these components may be used in an amount ranging from 0.5 to about 5 parts per each 100 parts of resin used.

Other ingredients which may be incorporated in the composition, depending upon the type of product to be prepared therefrom, include fillers, for example, calcium carbonates, whitings and the like; and pigments such as titanium dioxide. Such materials are both designated herein as filler-pigments. Usually used for their opacifying power and for their ability to control the surface gloss of the finished articles, these filler-pigments may be employed in amounts ranging from about 0.5 to 20 parts per 100 parts of resin. Other ingredients which also may be added, particularly when it is desired to prepare clear finished articles from the composition, are colorants and/or toners normally used in extremely small amounts, depending upon the intensity of the color desired in the finished article.

As described hereinbefore, the densified rigid polyvinyl chlorine resin powder composition of this invention is prepared in a high-shear mixer equipped with high-speed agitation means wherein the charged ingredients are rapidly recirculated by centrifugal action or other similar force at high velocity. Heat is supplied to the blending mixture by frictional heat developed by dissipation of kinetic energy resulting from intensive particle-to-particle and particle-to-metal impingement within the mixer. However, in contrast to prior methods for preparing similar compositions wherein the ingredients thereof have been blended up to a maximum mix temperature ranging from 290° to 340° F., the densified powder composition of this invention is blended up to a maximum mix temperature ranging from at least 340° up to about 425° F., preferably from about 360° to 390° F. Thus, in the process of this invention, the mixing cycle is continued up to temperatures at which it would be expected that substantial resin agglomeration, i.e., fusing together of resin particles with appreciable increase of density, would be effected. Surprisingly, it has been found, however, that no substantial resin agglomeration develops in the composition even at the maximum mix temperature, although the desired increase in bulk density of the dryblend is attained. Thus, the prepared powder composition has an average particle size range which is substantially the same as that of the base resin incorporated therein, indicating that no permanent adhesion or agglomeration has developed between resin particles in the blending process. Upon attaining the maximum mix temperatures desired, the blended mixture is discharged from the mixer into another vessel wherein it is rapidly cooled with agitation. In addition to promoting good heat transfer and rapid cooling in the mixture, agitation also serves to break up any lumps of blended material which may form in the blending cycle. The finished resin composition is a particulate, substantially non-agglomerated, free-flowing resin powder wherein the individual particles have a slightly sintered or glazed surface. The selected resin-modifying ingredients incorporated in the composition are absorbed and/or adsorbed by each resinous particle. The term "intimate dispersion," as used herein in the specification, refers to the integration or, as stated in another manner, the homogeneous absorption and/or adsorption of stabilizer, processing aid or lubricant within the resin particles. "Resin" in this instance includes both the major polyvinyl chloride component and the resinous impact modifier dispersed therewith.

In preparing the composition, the sequence in which the resin-modifying ingredients are incorporated into the resin is not especially critical and generally may be accomplished in any convenient manner, provided a composition having the desired bulk density is attained.

However, in order to assure optimum processing performance and high quality products, it is preferred to withhold addition of the lubricant or at least the major amount of the total lubricant to be added until all of the other ingredients have been incorporated. Most advantageously, the lubricant is withheld until the blending mixture has attained a temperature of at least 300° F.

If a processing aid for the resin is employed, e.g., when the powder composition is to be subsequently processed at extremely high shear rates requiring optimum hot melt properties in the resin, it is also particularly advantageous to withhold this ingredient from the blend during the initial mixing cycle. In general, prior art practices have incorporated such ingredients during the initial blending cycle. It has been found that if the processing aid is added to the blend during the cooling cycle therefor as described hereinafter, it becomes much more homogeneously dispersed throughout the resin and consequently, "dusts" significantly less out of the compound.

A blending technique which generally may be employed herein is to charge the resin and one or more of the other ingredients, usually the stabilizer, to the mixer at ambient temperature if the mixing operation is conducted on a batch basis. If mixing is being carried out on a continuous basis, these ingredients typically may be charged to the mixer which is at a higher temperature, e.g., 200° to 225° F. In a typical batch operation, the resin and the stabilizer components are mixed together until the temperature of the blend is raised to at least 170° F. Thereafter, the impact modifier and any pigments to be employed are incorporated either together or separately as the temperature of the blend is raised by frictional heat to about 180° to 190° F. Mixing is then continued until the blend reaches at least 300° to 350° F., at which temperature the lubricant is added to the blend, after which mixing of the blend is continued until the desired discharge temperature, which is within the range of about 340° to 425° F., depending upon the formulation prepared.

Upon attaining the desired discharge temperature, the blended composition is transferred from the high-shear mixing chamber to a cooling vessel wherein it is cooled prior to use or storage. The composition need not be cooled to a temperature below about 225° F., if it is to be processed directly after preparation. However, if it is to be stored prior to use or is to be packaged, the composition is preferably cooled to a temperature of about 125° F. before removal from the cooling vessel.

As described hereinabove, a processing aid for the resin, if employed, is preferably incorporated into the blended composition during the cooling stage. It is added typically when the blend has been cooled to at least 250° F., preferably to at least 200° F. To insure the optimum homogeneous dispersion of the processing aid in the blend, it should not be added after the composition has been cooled to a temperature below about 150° F.

By reason of the significantly altered fusion characteristics of the rigid resin composition of this invention by comparison to prior art compositions, it can be processed at faster rates than the prior compositions even in equipment which has not been adapted heretofore to powder processing. The densified powder composition of this invention likewise exhibits a higher bulk density than prior art polyvinyl chloride resin powder compositions of similar formulation. Depending upon the particular formulation employed, the bulk density of the composition ranges generally from about 0.55 g./cc. to about 0.80 g./cc. Within this bulk density range, a formulation prepared with very little or essentially no filler loading exhibits a bulk density ranging typically from about 0.60 g./cc. to 0.79 g./cc. In practice, such a formulation contains, based on the total weight of the composition, from 76.5% to 99.2% resin. This formulation contains, based on the weight of resin, from about 0.25% to 5% of stabilizer, from 0.5% to about 5% filler-pigment, from about 0.1% to about 5% lubricant and, optionally, from about 0.5% to about 10% of resinous impact modifier, and from 0.5% to about 5% of resinous processing aid. A composition of this type formulation is particularly adapted to the preparation of rigid pipe, film, sheet and various other shapes and profiles by extrusion processes. Specific products typically prepared from this composition include film for blister or skin packaging or for the fabrication of vacuum-formed containers; sheet for tanks, tank linings, hood and duct work, glazing panes, ceiling panels, vacuum-formed appliance housings, exhaust fan enclosures and louvers, shutters, vents and trays; pipe and conduit and various building components.

A densified resin powder composition of this invention which is particularly adapted to the preparation of high-quality, blow molded hollow articles, e.g., containers, bottles or tanks, typically has a bulk density ranging from about 0.55 g./cc. to about 0.70 g./cc. Such a formulation usually contains, based on the weight of the composition, from 75.2% to 98.7% resin. It contains, based on the weight of the resin, from about 1% to 3% of stabilizer, from 0% to about 15% resinous impact modifier, from 0% to about 5% of a filler-pigment, from about 0.25% to about 5% of a lubricant and from 0% to about 5% of a resinous processing aid.

A highly filled densified composition, which contains from at least 5% to 20% filler-pigment has a bulk density generally ranging from 0.65 g./cc. to 0.80 g./cc. Such a formulation contains, by total weight, from 62% to 89.2% resin, and also incorporates, by weight of resin, from 1% to 7% stabilizer, from 5% to 20% impact modifier, from 1% to 8% lubricant, and from 0% to 5% processing aid. Highly filled compositions are particularly adapted to the fabrication of a variety of articles both by profile extrusion and injecting molding. Specific products fabricated from this type composition include residential siding, window and door trim, storm and screen sash and track, pipe fittings, electrical fittings and components, appliance housings and components, trash cans and containers, battery cases, air conditioner grills, and decorative architectural grillwork.

The improved fusion characteristics exhibited by the composition make it possible for the processingt hereof at optimum rates in a variety of processing equipment without danger of surging and air occlusion, etc. which would deleteriously affect the appearance and properties of the finished articles. For example, various extruded articles such as pipe, fittings, tubes or sheeting having high surface gloss and smoothness may be efficiently fabricated from the composition in simple or non-vented extruders in which rigid polyvinyl chloride resin powders of similar formulation could not be processed satisfactorily heretofore. Thus, it can easily be recognized that use of the densified composition of this invention is particularly advantageous to those vinyl fabricators who do not have vented extruders or other similar equipment.

In a presently preferred composition of the present invention formulated particularly for extrusion applications, a processing aid for the resin such as typically employed heretofore to impart the necessary melt flow properties thereto has been eliminated. Surprisingly, therefore, it is now possible to employ efficiently a rigid polyvinyl chloride composition which contains no resinous processing aid to prepare extruded articles having excellent physical properties and appearance.

By varying the formulation of the composition within the range of ingredients as stated herein and by mixing these ingredients in accordance with the mixing process of this invention, densified rigid polyvinyl chloride resin compositions are prepared which may be processed with less swell than has been encountered when processing previous rigid powder compositions under the same conditions. Sizing difficulties with respect to extruded shapes are minimized as well as undesirable variations in wall thickness thereof.

In order that those skilled in the art may more completely understand the present invention and the preferred methods by which the same may be carried into effect, the following specific examples are offered. In these examples and elsewhere herein where proportions of ingredients are described in parts, such proportions are by weight.

Example 1

A rigid polyvinyl chloride resin powder composition of this invention which is suitable for extrusion applications s prepared without processing aid as used heretofore in the art. The composition is blended in a two-stage, high-shear mixer (Papenmeier Mixer, Model TSEG–500/KMSO–800 with a total capacity of 17.5/28.0 cubic feet). The polyvinyl chloride resin used has been produced in an aqueous suspension polymerization process and has a relative viscosity of 2.35, determined by measuring at 30° C., a one-percent solution of the polymer in cyclohexanone. For each 100 parts of resin in the formulation there is blended therewith, 2 parts of a liquid organic tin mercaptide stabilizer (Thermolite 31–Metal and Thermit), 1.5 parts of titanium dioxide as filler-pigment, and as lubricant, 0.8 part of a high melting paraffin wax (Aristowax-Lanair Co.) and 2 parts of calcium stearate.

In the blending operation, the resin and the stabilizer are charged to the mixer at ambient temperature and the mixing cycle is started. When the temperature of the mixture reaches 215° F., the titanium dioxide is incorporated. At a blend temperature of 320° F., the paraffin wax is added; the calcium stearate is incorporated when the mixture reaches a temperature of 340° F. The blending mixture is discharged into the cooling vessel when a blend temperature of 365° F. is reached (total blend time is 15 minutes). The mixture is cooled with agitation to 145° F. The finished composition has a bulk density of 0.69 g./cc.

A similar formulation is prepared by the same mixing procedure but is discharged from the mixer when a blend temperature of 320° F. is attained (12 minutes blending time). In this procedure, the paraffin wax and calcium stearate components are incorporated at blend temperatures of 275° F. and 295° F., respectively. This blend is cooled with agitation to 145° F. also. The bulk density of this composition is 0.58 g./cc.

Screen analysis of the two blended formulations indicates that the composition mixed to the higher maximum temperature has approximately the same particle size distribution as that mixed to the lower maximum temperature. Thus no significant agglomeration of the formulation occurs during mixing. The screen analysis data are as follows, including that of the base polyvinyl chloride resin employed:

|  | Percent retained | | |
| --- | --- | --- | --- |
|  | Blend | | |
|  | 365° F. max. | 320° F. max. | Base resin |
| U.S. screen size, mesh: | | | |
| 40 | 2 | [1] T | 0 |
| 60 | 1 | 1 | [1] T |
| 80 | 14 | 26 | 23 |
| 100 | 45 | 46 | 55 |
| 140 | 26 | 20 | 18 |
| 200 | 9 | 6 | 4 |
| <200 | 3 | [1] T | [1] T |

[1] T=Trace amount.

Each of the above compositions is employed to produce 1-inch Schedule 40 pipe. They are processed by gravity feed in a 2½-inch vented Prodex Extruder (24:1 $L/D$ ratio), using a single-stage screw having an over-all compression ratio of 3:1. For each run, the heating zones of the extruder are maintained at 400° F. and the die temperature at 400° F. The following extrusion data are obtained:

| | Maximum blend temperature, °F. | Screw speed, r.p.m. | Stock temperature, °F. | Extrusion rate, lbs./hr. |
| --- | --- | --- | --- | --- |
| Composition: | | | | |
| 1 | 365 | 50 | 420 | 121 |
| 2 | 320 | 50 | 430 | 114 |

The composition mixed to the higher maximum temperature (#1) extrudes at a faster rate than the composition prepared to the lower drop temperature (#2). During the extrusion, no surging of composition #1 is observed and the pipe product has a smooth and glossy surface inside and out, with no irregularity. Some surging is observed with respect to composition #2 and the pipe produced therefrom has, accordingly, a partially irregular, dull surface.

Although the rigid resin powder composition of this invention as described in this example is formulated without a resinous processing aid in contrast to prior art practice, extruded products fabricated therefrom exhibit generally improved physical properties, particularly impact resistance and hardness by comparison to powder formulations which contain processing aid and are blended up to maximum temperatures of 250° to 260° F., in accordance with the prior art. An example of such a prior art composition is set forth in Example 2 below (Composition No. 2). Likewise, products produced from the composition of this example possess improved chemical resistance over prior art products. Following are some comparative physical and chemical property values obtained from molded test specimens of this composition and from those of the prior art formulation as described in Example 2:

| | ASTM test | Composition of this example | Composition (2) of Example 2 |
| --- | --- | --- | --- |
| Physical properties: | | | |
| Tensile strength, p.s.i. | D638 | 8,230 | 7,500 |
| Tensile modulus, p.s.i. | D638 | 485,000 | 420,000 |
| Flexural strength, p.s.i. | D790 | 13,270 | 13,000 |
| Izod impact, ft. lbs./in. notch | D256 | 1.6 | 0.70 |
| Hardness, Shore D | D1706 | 85/1 | 85/1 |
| Deflection temperature, °C. under 264 p.s.i. load. | D648 | 73 | 72 |
| Chemical resistance: 93% sulfuric acid.[1] | D543 | | |
| Change in weight: | | | |
| Increase, percent max | | 0.0 | [2] 1.0 |
| Decrease, percent max | | [2] 0.02 | 0.1 |
| Change in flexural strength: | | | |
| Increase, percent max | | 4.0 | 5. |
| Decrease, percent max | | 0.0 | 5. |

[1] 14 days floating at 55° C.
[2] No sweating of specimen.

The composition of this example has exceptional chemical resistance when compared to typical dryblended formulations of the prior art as exemplified by composition (2) of Example 2. When these compositions are tested using very strong chemicals, the following values are obtained:

CHEMICAL IMMERSION DATA AFTER 28 DAYS AT 60° C.

| Reagent | Tensile (p.s.i.) | Tensile modulus (p.s.i.) | Percent change in weight |
| --- | --- | --- | --- |
| Composition of this example [1] | 8,230 | 485,000 | |
| Composition of Example 2 [1] (non-immersed control) | 7,500 | 420,000 | |
| 98% conc. sulfuric acid: | | | |
| Composition #1 | 9,410 | 460,000 | −0.05 |
| Composition #2 | 8,500 | 383,000 | −0.09 |
| Acetic acid (glacial): | | | |
| Composition #1 | 5,780 | 380,000 | 6.53 |
| Composition #2 | 2,800 | 213,000 | 10.85 |
| Nitric acid (68% conc.): | | | |
| Composition #1 | 9,050 | 480,000 | 1.10 |
| Composition #2 | 7,300 | 376,000 | 2.43 |
| Methyl alcohol: | | | |
| Composition #1 | 7,930 | 470,000 | 1.81 |
| Composition #2 | 6,000 | 395,000 | 3.48 |

[1] Non-immersed control.

Following are drop impact values obtained for 1-inch Schedule 40 pipe fabricated from the rigid resin composition of this example, in accordance with standard Underwriters Laboratory and ASTM test procedures:

| Test procedure | Minimum requirement, foot pounds | Impact value of this composition, foot pounds |
| --- | --- | --- |
| U.L. 20 lb. Blunt Tup (weight) | 100 | 120 |
| ASTM D2444 12 lb. Tup C (ASTM DWV Specification) | [1] 60 | 64.5±3.9 |

[1] On 1¼ inch pipe and above.

As these data indicate, the composition of this example is processed to prepare rigid pipe having impact drop values substantially above the minimum requirements set by both the U.L. and the ASTM for acceptable pipe. Additionally, 2-inch Schedule 40 pipe fabricated from the composition exhibits drop impact values of 86.4±4.08 foot pounds, when tested in accordance with the ASTM D2444 procedure.

One-inch Schedule 40 pipe fabricated from the rigid resin composition of Example 2 below, when tested in accordance with the U.L. procedure designated, exhibits an impact value of 40 foot pounds. (Prior art composition (2).)

Example 2

This example illustrates the significantly improved extrusion rates obtained with the rigid polyvinyl chloride resin powder composition of this invention compared to that realized from a similar composition dryblended according to prior art methods.

The formulation employed is as follows:

| | Parts |
| --- | --- |
| Polyvinyl chloride (relative viscosity=2.35) | 100 |
| Thermolite 31 | 2 |
| Carbon black | 0.075 |
| Titanium dioxide | 1 |
| K-120-N [1] | 5 |
| Paraffin wax | 0.8 |
| Calcium stearate | 2 |

[1] Acryl acrylate-methyl methacrylate copolymer (Rohm and Haas) as processing aid.

The resin and stabilizer ingredients are charged to the high-shear mixer employed in Example 1, and the mixing cycle is started. When the blending mixture reaches a temperature of 215° F., the titanium dioxide and carbon black are incorporated. The acryl acrylate-methyl methacrylate copolymer ingredient is added when the mixture reaches 285° F. The paraffin wax and calcium stearate are subsequently added at blend temperatures of 335° and 355° F., respectively. When the blending mixture attains a temperature of 380° F. (total blending time of 13 minutes), it is discharged into a cooling vessel wherein it is cooled to 145° F. as in Example 1. The density of the finished blend is 0.693 g./cc.

A similar formulation is blended in the same mixer and with the same order of ingredient addition. However, the maximum blend temperature attained by the mixture at discharge in 250° F. This composition, which is a conventional polyvinyl chloride resin powder blend as long used in the art, has a bulk density of approximately 0.51 g./cc.

Each formulation is processed to prepare one-inch Schedule 40 pipe, employing the gravity-fed, 2½-inch Prodex Extruder described in Example 1. The screw is maintained at at speed of 48 r.p.m. For each formulation, the temperature of the extrudate from the die is 420° to 425° F. The rigid resin composition of this invention extrudes at a rate of 100 lbs./hr., while the conventional powder blend extrudes at a rate of 67.5 lbs./hr. Thus, the composition of this invention can be extruded over 48% faster than the conventional powder blend.

Example 3

A rigid polyvinyl chloride resin powder composition for use in blow molding rigid bottles is prepared according to the mixing procedure of this invention, employing the following formulation:

| | Parts |
|---|---|
| Polyvinyl chloride [1] | 100 |
| Organic tin mercaptide stabilizer [2] | 1.7 |
| Styrene-butadiene-acrylnitrile terpolymers [3] | 8.0 |
| K-120-N [2] | 2.0 |
| Paraffin wax | 0.5 |
| Magnesium stearate | 0.5 |
| Calcium stearate | 0.5 |
| Ultramarine blue toner | 0.001 |

[1] Relative viscosity=2.10.
[2] As described previously.
[3] Blendex 301, manufactured by Marbon Chemical Co.

For this experiment, the high-shear mixer employed is a Henschel Fluid Mixer, Model 35-SS, manufactured by the Prodex Corp., Fords, N.J. The resin and stabilizer are charged to the mixer at ambient temperature and the mixing cycle is started. When the blending mixture has reached a temperature of about 180° F., the styrene-butadiene-acrylonitrile terpolymer is added to the mixer. Mixing is continued until the blending mixture attains a temperature of 320° F., at which temperature the paraffin wax is added. The calcium and magnesium stearates and toner are added at a mix temperature of 340° F. The mixture is discharged into a cooling vessel from the mixer when it reaches a temperature of 365° F. (13 minutes total blending time). The K-120-N ingredient is incorporated when the blend has cooled with agitaion to about 165° F. When the blend is cooled to 145° F., it is discharged from the cooling vessel. The bulk density of the finished composition is 0.62 g./cc.

For comparison, the same formulation is blended in the mixer until a maximum blend temperature of 320° F. is attained. In this procedure, the paraffin is added when the blending mixture attains a temperature of 280° F.; the stearates and toner are incorporated when the mix temperature is 300° F. Similarly, this blend is discharged from the mixer into the cooling vessel and likewise mixed therein with agitation until a final mix temperature of 145° F. is reached. The K-120-N ingredient is added during the cooling cycle as described above. The bulk density of this blend is found to be 0.54 g./cc.

The particle size distribution of the two formulations is found to be as follows:

| Maximum blend temperature | Percent retained | |
|---|---|---|
| | 320° F. | 365° F. |
| U.S. screen size, mesh: | | |
| 40 | 2 | 2 |
| 60 | 3 | 2 |
| 80 | 25 | 13 |
| 100 | 41 | 34 |
| 140 | 25 | 36 |
| 200 | 3 | 11 |
| <200 | 1 | 2 |

As these values indicate, no agglomeration occurs as would be evidenced by increased percentages of the formulation retained on the screens of larger mesh openings, when the formulation is mixed to a maximum temperature of 365° F., by comparison to the average particle size of the formulation mixed to a maximum temperature of 320° F. Likewise, the composition mixed to the higher drop temperature exhibits significantly less "dusting" than the formulation mixed to the lower drop temperature, although the percentage of smaller particles therein is higher as evidenced by the screen analysis.

Both formulations are processed in a non-vented, NRM extruder having an L/D ratio of 20:1, employing a single-stage screw having an over-all compression ratio of 2.4 to 1. In each run, the first heating zone of the extruder barrel is maintained at 320° F., and the other zones at 340° to 350° F. The extruder head is maintained at 330° F., and the die temperature at approximately 420° F. Operating the screw at two different speeds for each formulation, the following extrusion rates are observed, each extrudate being blow molded into 15-ounce clear bottles by standard molding procedures:

| | Maximum mix temperature, ° F. | Screw speed, r.p.m. | Stock temperature, ° F. | Rate lbs./hr |
|---|---|---|---|---|
| Blend: | | | | |
| #1 | 365 | 40 | 420 | 73 |
| #2 | 320 | 40 | 415 | 59 |
| #1 | 365 | 60 | 445 | 100 |
| #2 | 320 | 60 | 445 | 80 |

It is found that at both screw speeds, the composition of this invention (Blend #1), extrudes at a rate which is 23-25 percent faster than that of the composition prepared at a maximum mix temperature of 320° F. (Blend #2). Further, although a non-vented extruder is used, the bottles prepared from the composition of this invention are of smooth and regular surface and exhibit no air occlusion. Those prepared from the formulation with the lower maximum blend temperature, however, exhibit air occlusion at either extruder screw speed and have an irregular surface, indicating incomplete fusion of the blend during extrusion.

Examples 4-6

A mighly-filled resin composition for use in the production of extruded articles is prepared repeatedly according to the present invention, increasing the maximum temperature attained by the blended material each time before discharge. The formulation employed is as follows:

| | Parts |
|---|---|
| Polyvinyl chloride (relative viscosity=2.10) | 100 |
| Thermolite 31 [1] | 2 |
| Alkaryl phosphite | 0.5 |
| Acrylonitrile-styrene-butadiene terpolymer [1] | 10.0 |
| Titanium dioxide | 15.0 |
| Calcium carbonate | 2.0 |
| Paraffin wax | 1.4 |
| Calcium stearate | 1.0 |
| Magnesium stearate | 1.0 |

[1] As described previously.

For each experiment, the resin, stabilizer and terpolymer components are charged to the two-stage, high-shear mixer employed in Example 1 and the mixing cycle is started. At a mix temperature of 180° F., the titanium dioxide and calcium carbonate components are added. The paraffin and stearates are added at a mix temperature of 210° and 220° F., respectively. After addition of the lubricants, mixing is continued in each instance until a blend temperature is reached as indicated below. The bulk density of each composition is as indicated:

|  | Maximum blend temperature, °F. | Bulk density, g./cc. |
|---|---|---|
| Example: | | |
| #4 | 340 | 0.67 |
| #5 | 360 | 0.77 |
| #6 | 365 | 0.79 |

Each composition is processed in a NRM 2½-inch, gravity-fed extruder (L/D ratio=20:1), employing a two-stage screw having an over-all compression ratio of 1.8 to 1, and operated at a speed of 31 r.p.m. The zones of the extruder, from back to front, are maintained at 330°, 340°, 345–50° and 350° F., respectively. The die temperature is approximately 370° F. and the stock temperature is 390° F. The extrusion rates for the different compositions are as follows:

Extrusion rate, lb./hr.
Example #4 _____ 83
Example #5 _____ 92
Example #6 _____ 95

A similar formulation which is dryblended as conventionally practiced in the art extrudes under these same conditions at a rate of only 74 pounds per hour.

The densified rigid resin powder compositions of these examples do not become agglomerated during preparation as evidenced by the following screen analyses:

|  | Product of— | |
|---|---|---|
|  | Example 4 | Example 6 |
| U.S. screen size: | | |
| 40 | 0 | 0 |
| 60 | 2 | 3 |
| 80 | 17 | 15 |
| 100 | 38 | 35 |
| 140 | 29 | 31 |
| 200 | 8 | 9 |
| <200 | 6 | 7 |

Example 7

This example illustrates the preparation of a regid polyvinyl chloride resin powder composition which contains high molecular weight resin and its effective application in the production of injected molded articles.

In this example, the formulation employed is the same as that outlined in Example 2, except that the resin used has a relative viscosity of 2.55. Likewise, in this example all of the ingredients with the exception of the lubricants are charged to the high-shear mixer at the beginning of the mixing cycle. The lubricants, i.e., the wax and calcium stearate, are incorporated when the blending mixture reaches a temperature of 210° F. Thereafter, mixing is continued until the mixture reaches a temperature of 425° F., at which temperature the mixture is discharged into the cooling vessel. The total blending time is 22 minutes and the finished composition has a bulk density of 0.79 g./cc.

This composition is fed to a HPM, 20-ounce Egan Reciprocating Screw Injection Molding Machine. The front zone of the plasticizer is maintained at 365° F. Pipe fittings (one-inch Schedule 40 T's) of excellent quality are produced in one-minute molding cycles. These products cannot be prepared under the same conditions, employing a similar formulation which has been blended by prior art methods.

Example 8

In this example, a densified rigid polyvinyl chloride resin composition is prepared for extrusion. The polyvinyl chloride resin used is Vygen 120, which is manufactured by General Tire Chemical Company and has a relative viscosity of 2.70, determined as set forth herein. For each 100 parts of resin, there is employed 1.8 parts of liquid organic tin mercaptide stabilizer, 1 part of titanium dioxide, and, as lubricants, 0.8 part of high melting paraffin wax, 1.5 parts of calcium stearate and 0.5 part of magnesium stearate.

The resin and stabilizer are charged to the mixer which is at a temperature of 120° F., and the mixing cycle is started. When the mixture reaches a temperature of 220° F., the titanium dioxide is added. At a blend temperature of 325° F., the paraffin wax is added; the calcium and magnesium stearate are incorporated at a blend temperature of 340° F. The mixture is discharged into the cooling vessel when a blend reaches a temperature of 365° F. The finished composition has a bulk density of 0.635 g./cc.

The composition is employed to prepare 1-inch Schedule 40 pipe, being processed by gravity feed in the 2½-inch vented Prodex Extruder as employed in Example 1 with the single-stage screw. The heating zones of the extruder are maintained at temperatures of 380° F. to 420° F., incrementally increased from the back to the front of the extruder. The die temperature is maintained at 410° F. This composition processes at a rate of 138 pounds per hour. The pipe product prepared shows no evidence of any thermal decomposition, having interior and exterior surfaces which are smooth and glossy.

Another composition is prepared similarly, incorporating a resin which has a relative viscosity of about 3.00 and a bulk density of 0.62 g./cc. The bulk density of the finished composition is 0.77 g./cc. This composition is extruded under conditions as set forth above to prepare 1-inch Schedule 40 pipe at a rate of 128 pounds per hour with no sizing difficulties. The finished pipe has a smooth, glossy surface and shows no evidence of thermal breakdown.

It is to be understood that although the invention has been described with specific reference to particular embodiments thereof, it is not to be so limited, since changes and alterations therein may be made which are within the full intended scope of this invention as defined by the appended claims.

We claim:
1. A method for preparing a particulate, substantially non-agglomerated resin powder composition having a bulk density ranging between about 0.55 g./cc. and about 0.80 g./cc. comprising the steps of introducing into a high-shear mixing apparatus particulate polyvinyl chloride resin and from about 0.25% to 7%, by weight of the resin, of a heat stabilizer therefor which is at least one compound selected from the group consisting of metallic soaps, alkyl tin salts, organic esters of phosphorous acid, organic tin compounds which contain at least one Sn-S linkage, inorganic lead salts and salts containing complexed barium, cadmium, calcium or zinc metals; starting the high-speed agitator and intimately blending the resin and stabilizer ingredients until the temperature of the resultant mixture is raised by frictional heat to at least 170° F.; then adding to the mixture with continued mixing, from 0% to 20%, by weight of the resin, of a filler-pigment and from 0% to 20%, by weight of the resin, of a resinous impact modifier therefor, said resinous impact modifier being selected from the group consisting of terpolymers containing a major percentage of butadiene in combination with styrene and either acrylonitrile or methyl methacrylate, copolymers of ethylene and vinyl esters of lower fatty acids, copolymers of ethylene and alkyl acrylates or alkyl methacrylates, and chlorinated polyethylenes; adding from 0.1% to 8%, by weight of the resin, of a non-resinous lubricant which is at least one compound selected from the group consisting of fatty acids of 12–18 C atoms, the metallic salt, ester wax and partially saponified ester wax derivatives of fatty acids of 12–18 C atoms, organic liquids containing epoxy groups, naturally occurring and synthesic hydrocarbon waxes, mineral oil and glycerine when the blending mixture attains a temperature of at least 300° F.; thereafter continuing mixing of the composition until it attains a temperature of 360°–425° F.; transferring said composition from the mixing apparatus to a cooling vessel; and finally cooling the composition with agitation to a temperature no higher than 225° F. prior to use.

2. In a method for preparing a rigid polyvinyl chloride resin powder composition in a high-shear mixing apparatus equipped with high-speed agitation means, the improvement which comprises blending together a particulate, suspension-polymerized polyvinyl chloride resin and, based on the weight of the resin, from 0.25% to 7% of a heat stabilizer therefor, from 0% to 20% of a resinous impact modifier, from 0% to 20% of a filler-pigment, from 0.1% to 8% of a non-resinous lubricant, and from 0% to about 5% of a resinous processing aid in the high-shear mixing apparatus until the temperature of the blending mixture is raised by frictional heat to a temperature ranging from about 360° F. to 425° F. prior to removing the blended composition from said high-shear mixing apparatus and subsequently cooling said composition with agitation, whereby a rigid polyvinyl chloride resin powder composition having a bulk density ranging from about 0.55 g./cc. to about 0.80 g./cc. is produced.

3. The method of claim 2 wherein the suspension-polymerized polyvinyl chloride resin has a relative viscosity ranging from 1.70 to 3.00, as determined at 30° C., employing a 1-percent solution of said resin in cyclohexanone.

4. The method of claim 2 wherein the lubricant is incorporated into the blending mixture after said blending mixture has attained, with continued mixing, a temperature of at least 300° F.

5. The method of claim 1 wherein there is added to the composition from about 0.5 to about 5 percent, based on the weight of the polyvinyl chloride resin component, of a resinous processing aid when the temperature of the composition has been reduced in the cooling vessel to below 250° F., said resinous processing aid being selected from the group consisting of copolymers of alkyl esters of acrylic and methacrylic acids, acrylonitrile-styrene copolymers of high styrene content, terpolymers of butadiene with styrene and either acrylonitrile or methyl methacrylate which contain a major percentage of incorporated styrene, and chlorinated polyethylenes of low molecular weight.

6. The method of claim 5 wherein the resinous processing aid is added when the blended composition is cooled to a temperature ranging between 150° F. and 200° F.

References Cited

UNITED STATES PATENTS

| | | | |
|---|---|---|---|
| 2,753,322 | 7/1956 | Parks et al. | 260—891 |
| 2,970,979 | 2/1961 | Meder et al. | 260—891 |
| 3,271,482 | 9/1966 | Harada et al. | 264—15 |
| 3,283,034 | 11/1966 | Urbanic et al. | 260—891 |
| 3,367,997 | 2/1968 | Smith | 260—891 |
| 3,373,229 | 3/1968 | Philpot et al. | 260—899 |
| 3,384,586 | 5/1968 | McMillen | 252—33 |
| 3,388,196 | 6/1968 | Farrell | 264—75 |
| 3,406,136 | 10/1968 | Scarso et al. | 260—23.7 |
| 3,407,171 | 10/1968 | Segre | 260—41 |
| 3,424,823 | 1/1969 | Hall et al. | 260—898 |

DONALD E. CZAJA, Primary Examiner

R. A. WHITE, Assistant Examiner

U.S. Cl. X.R.

260—23, 28.5, 876, 891, 897, 898, 899, 901